(12) United States Patent
Mittal et al.

(10) Patent No.: US 7,593,547 B2
(45) Date of Patent: Sep. 22, 2009

(54) VIDEO-BASED ENCROACHMENT DETECTION

(75) Inventors: Anurag Mittal, Plainsboro, NJ (US); Imad Zoghlami, Plainsboro, NJ (US); Visvanathan Ramesh, Plainsboro, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 568 days.

(21) Appl. No.: 11/245,391

(22) Filed: Oct. 6, 2005

(65) Prior Publication Data

US 2006/0093187 A1 May 4, 2006

Related U.S. Application Data

(60) Provisional application No. 60/617,871, filed on Oct. 12, 2004, provisional application No. 60/617,880, filed on Oct. 12, 2004.

(51) Int. Cl.
*G06K 9/00* (2006.01)
(52) U.S. Cl. .................... 382/103; 382/154; 382/104; 382/107; 382/228; 703/2; 703/3; 703/6; 345/419; 348/42; 348/143; 348/149
(58) Field of Classification Search .............. 382/103, 382/154, 104, 107, 228; 340/937, 437, 541; 701/119, 142, 149; 348/149, 143; 703/2, 703/3, 6
See application file for complete search history.

(56) References Cited

U.S. PATENT DOCUMENTS

| | | | |
|---|---|---|---|
| 6,570,608 B1* | 5/2003 | Tserng | 348/143 |
| 6,999,004 B2* | 2/2006 | Comaniciu et al. | 340/937 |
| 7,006,950 B1* | 2/2006 | Greiffenhagen et al. | 703/2 |
| 7,079,992 B2* | 7/2006 | Greiffenhagen et al. | 703/2 |
| 7,149,325 B2* | 12/2006 | Pavlidis et al. | 382/103 |
| 7,200,266 B2* | 4/2007 | Ozer et al. | 382/173 |
| 7,224,852 B2* | 5/2007 | Lipton et al. | 382/294 |
| 7,512,262 B2* | 3/2009 | Criminisi et al. | 382/154 |
| 2003/0058111 A1* | 3/2003 | Lee et al. | 340/573.1 |
| 2004/0105579 A1* | 6/2004 | Ishii et al. | 382/154 |
| 2008/0100473 A1* | 5/2008 | Gao et al. | 340/937 |

OTHER PUBLICATIONS

Fast Lighting Independent Background Subtration, Ivanov et al., 2000.*
Dynamic programming framework for automatic video object segmentation and vision-assisted video pre-processing, 2005, Z. He.*
Face Detection and Tracking in Video Using Dynamic Programming, Liu et al, IEEE 2000.*
Multiple Single Pixel Dim Target Detection in Infrared Image Sequence Zaveri et al. IEEE 2003i.*

* cited by examiner

*Primary Examiner*—Daniel G Mariam
*Assistant Examiner*—Nancy Bitar

(57) ABSTRACT

A method and system for video-based encroachment detection are provided, the method including receiving first and second images, modeling a background from the first image, subtracting the background from the second image to provide a detection map, calibrating the size of an object from the pixel level, integrating a projection of the object with the detection map using dynamic programming, and detecting the object in a region if the projection matches that region of the detection map; and the system including a processor, a background modeling unit coupled with the processor for modeling a background from the first image and subtracting the background from the second image to provide a detection map, and a dynamic programming unit coupled with the processor for calibrating the size of an object from the pixel level, integrating a projection of the object with the detection map, and detecting the object in a region if the projection matches that region of the detection map.

20 Claims, 4 Drawing Sheets

VIDEO-BASED ENCROACHMENT DETECTION

CROSS-REFERENCE TO RELATED APPLICATION

This application claims the benefit of U.S. Provisional Application Ser. No. 60/617,871, filed Oct. 12, 2004 and entitled "Video-based Detection of Specified Objects in Forbidden Areas", which is incorporated herein by reference in its entirety and U.S. Provisional Application Ser. No. 60/617,880 filed Oct. 12, 2004 and entitled "Stationary Object Detection Via Order Consistency of Multiple Uncorrelated Observations."

BACKGROUND

Automatic processing of video data has become an important component of many detection applications. For example, applications such as security, access-control, traffic safety, and automotive and industrial automation can all make use of video processing. Automatic detection of particular objects in a user-selected region of a larger scene presents unique challenges.

A video-based method can be very useful for detection of prohibited objects in so-called "forbidden" zones, for instance. Such functionality is important in security applications, where detection of a person or animal entering a delineated area is needed. In image processing and surveillance applications, for example, encroachment detection is often desired for automatically detecting forbidden objects in a subset of a scene. Unfortunately, apparent overlap due to perspective may be misinterpreted as forbidden objects by automated systems, thus requiring human intervention and additional time.

SUMMARY

These and other drawbacks and disadvantages of the prior art are addressed by an exemplary system and method for video-based encroachment detection.

An exemplary system for video-based encroachment detection includes a processor, a background modeling unit coupled with the processor for modeling a background from the first image and subtracting the background from the second image to provide a detection map, and a dynamic programming unit coupled with the processor for calibrating the size of an object from the pixel level, integrating a projection of the object with the detection map, and detecting the object in a region if the projection matches that region of the detection map.

An exemplary method for video-based encroachment detection includes receiving first and second images, modeling a background from the first image, subtracting the background from the second image to provide a detection map, calibrating the size of an object from the pixel level, integrating a projection of the object with the detection map using dynamic programming, and detecting the object in a region if the projection matches that region of the detection map;

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for video-based encroachment detection in accordance with the following exemplary figures, in which.

DETAILED DESCRIPTION OF PREFERRED EMBODIMENTS

A system and method are provided for the detection of specified-size objects in prohibited areas. The method includes techniques for the determination of a foot or base of the objects in such regions, for determining if there is a new object at a pixel in the image, for efficient integration of pixel-wise detections using dynamic programming, for efficient processing of integration maps in order to determine the foot or base position of objects, for eliminating false foot or base positions that arise due to partial occlusions by using detections that are determined to be reliable, for distinguishing between detections of objects that simply occlude an area versus detection of objects that have their foot or base in such an area, for temporal reasoning to determine if an object stands or stays in the forbidden zone for a specified period of time, and for temporal reasoning to determine if an object becomes stationary in such a forbidden zone. The method does not require full calibration and may use a simple object size calibration.

Figure 1:
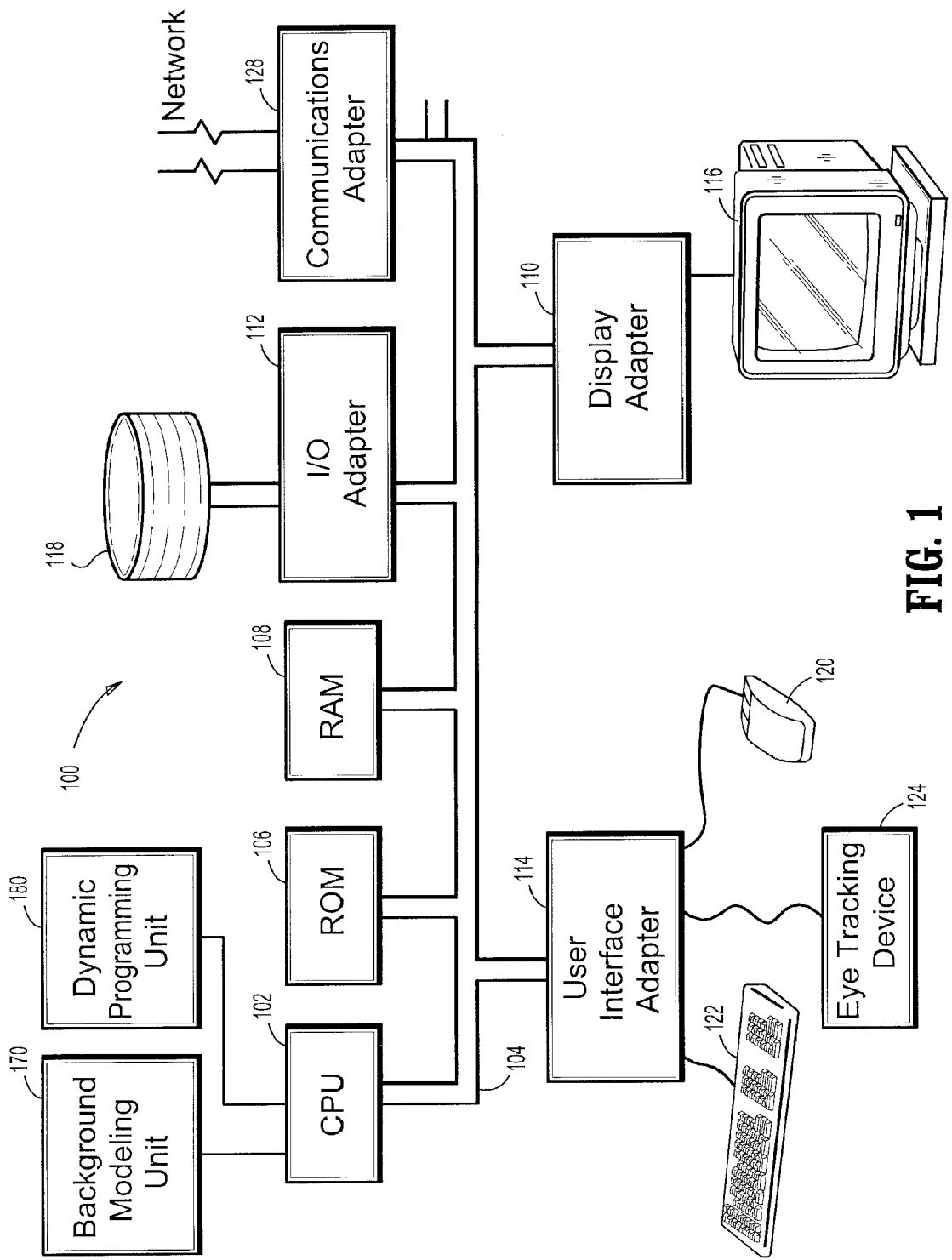
FIG. 1 shows a schematic diagram of a system for video-based encroachment detection in accordance with an illustrative embodiment of the present disclosure.

As shown in FIG. 1, a system for video-based encroachment detection, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A background modeling unit 170 and a dynamic programming unit 180 are also included in the system 100 and in signal communication with the CPU 102 and the system bus 104. While the background modeling unit 170 and the dynamic programming unit 180 are illustrated as coupled to the at least one processor or CPU 102, these components are preferably embodied in computer program code stored in at least one of the memories 106, 108 and 118, wherein the computer program code is executed by the CPU 102.

Figure 2:
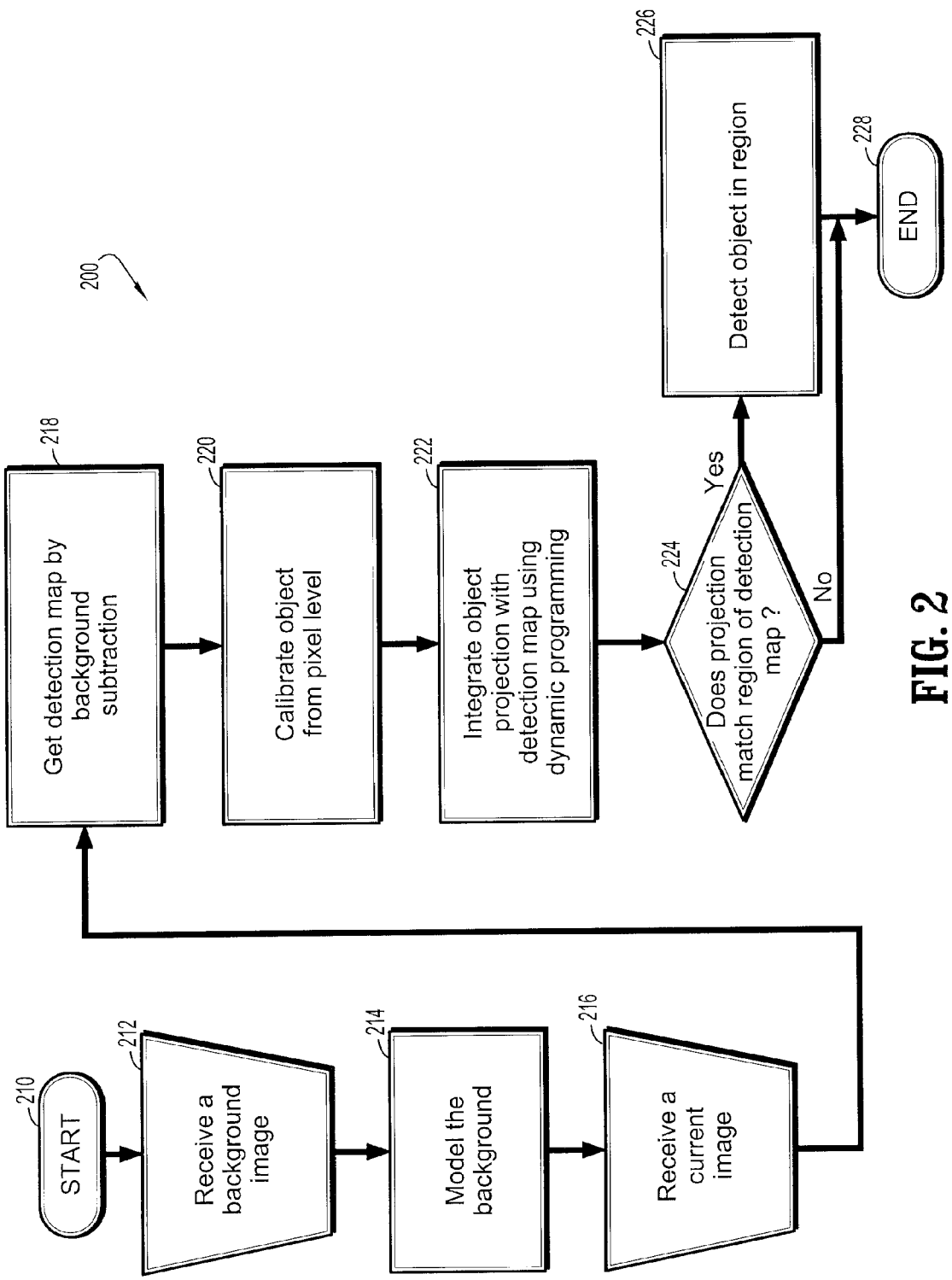
FIG. 2 shows a flow diagram of a method for video-based encroachment detection in accordance with an illustrative embodiment of the present disclosure.

Turning to FIG. 2, a method for video-based encroachment detection is indicated generally by the reference numeral 200. The method includes a start block 210 that passes control to a first input block 212. The first input block 212 receives a background image and passes control to a function block 214. The function block 214 models the background and passes control to a second input block 216. The second input block 216 receives a current image and passes control to a function block 218. The function block 218 obtains a detection map by performing a background subtraction and passes control to a function block 220.

The function block 220, in turn, calibrates an object from the pixel level and passes control to a function block 222. The function block 222 integrates the object projection with the detection map using dynamic programming and passes control to a decision block 224. The decision block 224 determines whether the projection matches a region of the detection map, and if so, passes control to a function block 226. The function block 226 detects the object and passes control to an end block 228. If the projection does not match a region of the detection map, the decision block 224 passes control to the end block 228.

Figure 3:
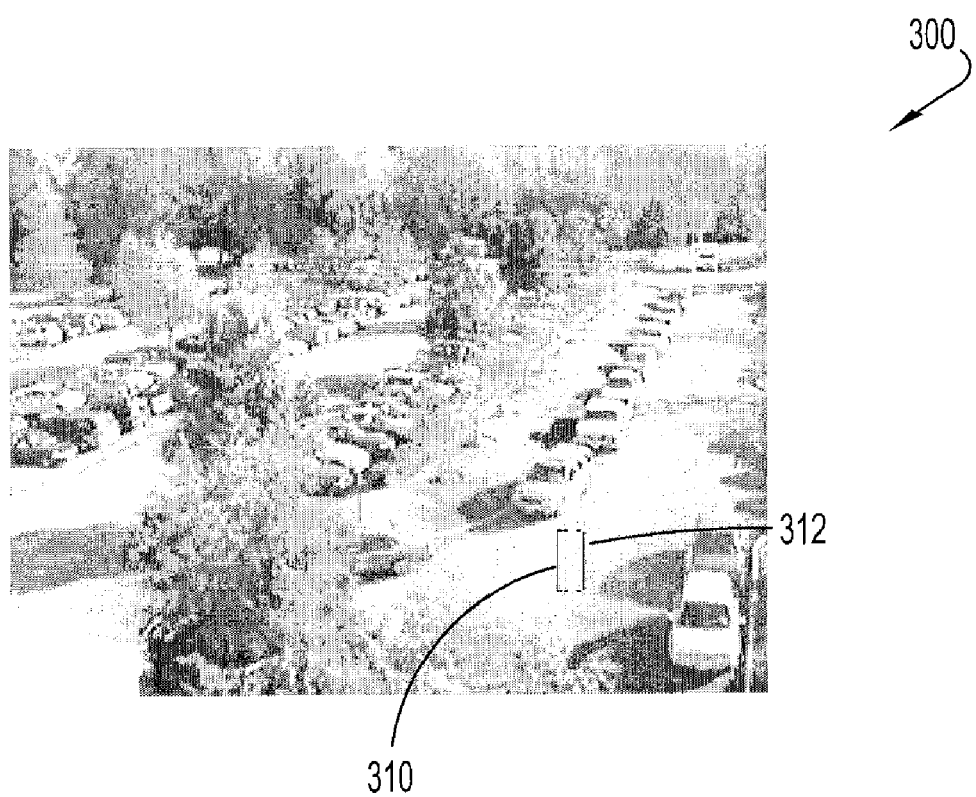
FIG. 3 shows a graphical diagram of image data with two adjacent regions having overlapping area in accordance with an illustrative embodiment of the present disclosure.

Turning now to FIG. 3, image data for a scene is indicated generally by the reference numeral 300. The image data 300 includes a first projection region 310 and a second projection region 312, where the second region 312 overlaps the first region 310. Dynamic programming may be used to efficiently compute summations in the projection regions. Since the two adjacent regions shown have overlapping area, the result for the second region 312 can be computed efficiently by using the result for first region 310.

Figure 4:
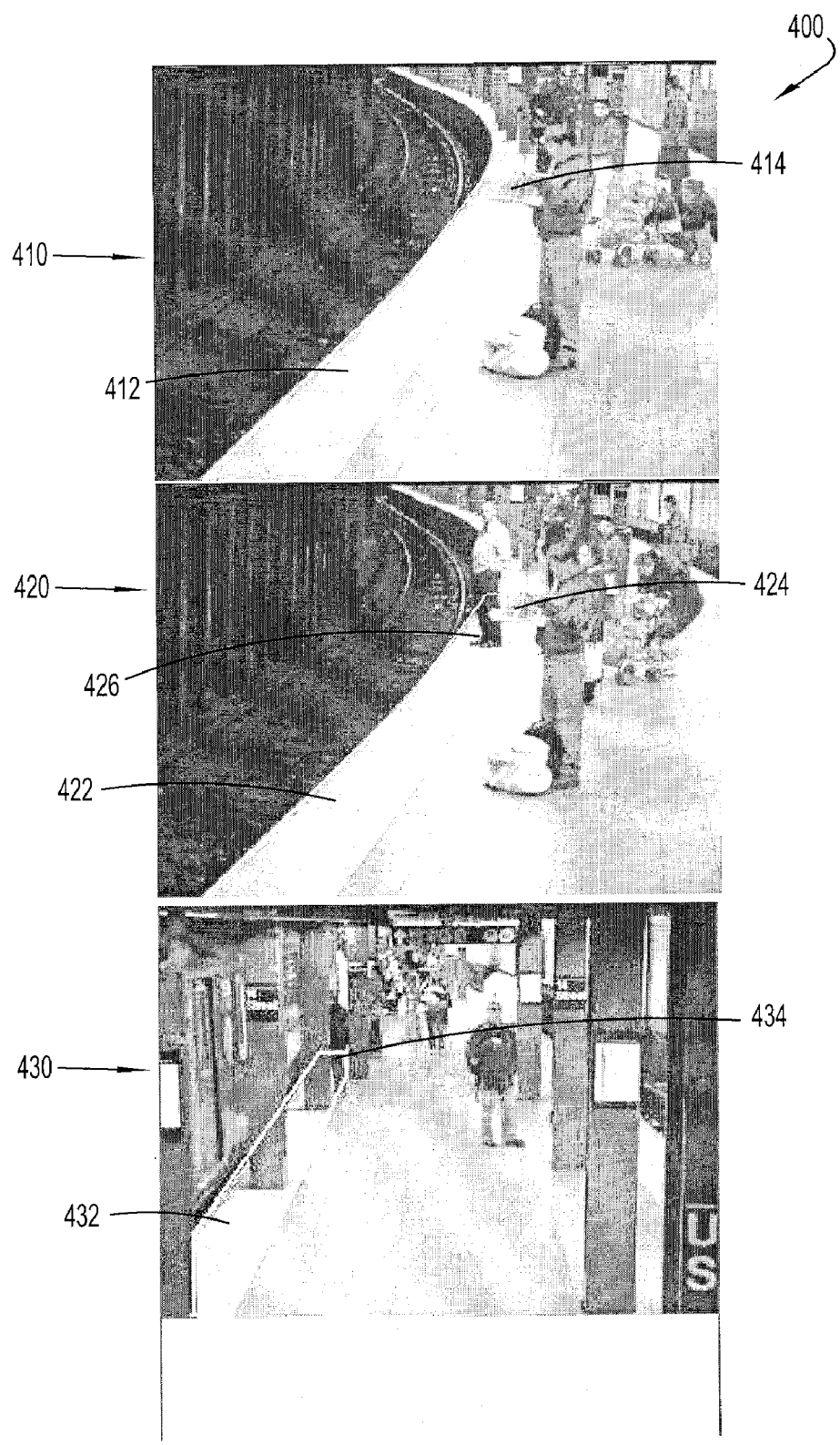
FIG. 4 shows graphical diagrams of image data with objects having a base or foot in a forbidden zone in accordance with an illustrative embodiment of the present disclosure.

As shown in FIG. 4, image data for scenes is indicated generally by the reference numeral 400. A first image 410 has a projection region 412. Here, an object 414 does not trigger an alarm since the object does not have a base or foot within the region. A second image 420 has a projection region 422. Here, a first object 424 does not trigger an alarm since the first object does not have a base or foot within the region, but a second object 426 does trigger an alarm since the second object does have a base or foot within the region. A third image 430 has a projection region 432. Here, an object 434 does trigger an alarm since the object does have a base or foot within the region. Thus, these results from an exemplary system for detection of objects with their base and/or foot in a forbidden zone show that the system triggers an alarm for the second and third images 420 and 430, but not for the first image 410.

In operation of an exemplary embodiment, particular objects are automatically detected in a user-selected region. This exemplary method is useful for detection of prohibited objects in forbidden zones, for example. The method combines the modeling of an existing background with subtraction techniques and efficient and effective integration mechanisms that yield probabilities of the presence of such objects in particular areas.

Background subtraction may be performed by techniques that include a mixture of Gaussians modeling, kernel-based modeling, texture-based methods, or motion-based approaches. Such modeling may be performed on a variety of feature spaces such as original intensity or RGB, normalized color space, or gradient/edge information. Such modeling yields a detection map that gives the probability of detection of a new object at each pixel, or groups of pixels for block-based methods.

Calibration may be performed to move from the pixel-level to the object level by using a description of the object size appearance. Such information can be provided by a camera calibration. The method does not require a very accurate calibration. To simplify the system setup, a simpler method may be used to provide the object size appearance. Assuming that the processed scene is a plane, settings are made in two different zones. The expected object size, such as width and height, is used with a simple interpolation to compute the object size appearance for the whole plane. Here, the width and height can be set separately in different regions.

Efficient Integration is accomplished by using such information from the pixel-level detector for making higher-level decisions about object presence in the scene. Given the shape of the object sought, it is possible to obtain an approximate projection onto the image that the object will form. Objects that are closer appear larger than distant objects. If cylinders approximate people, such a projection is invariant to the pose of the person. This, however, is not true for other objects such as cars.

Given such projections, the exemplary method creates a projection region that would be formed if the object were standing at that location for each point on the ground plane. The logic is used that an object presence at this location would lead to most of the pixels detecting change in the projection region. A threshold can then be set on the number of "on" pixels in this projection region. Determining the number of "on" pixels in the projection regions of all possible points on the ground plane can be an expensive process if performed naively. Thus, embodiments of the present disclosure use dynamic programming to efficiently find the summations for all of the projection regions. The technique uses the fact that the projection regions for consecutive points are generally of close to the same size, but differ in their position.

The summation is found in two steps. In the first step, a horizontal summation is performed that sums the relevant pixels in the horizontal direction. In the next step, the summation is performed in the vertical direction. This assumes that the horizontal summation regions do not change drastically with the change in vertical region. In order to perform horizontal summation, it is observed that given the projection region for a location to the left of the current location, the projection region for the current location has one extra point on the right and one point less on the left. This is shown in FIG. 3. Thus, determination of the summation for the current location involves one addition of the extra point and one subtraction of the redundant point, which can be performed very efficiently. A similar procedure in the vertical direction on the horizontal summations yields the complete 2D summation extremely efficiently.

Determination of a base position may be found as follows. Given a detection integration map that indicates the probabilities of the presence of an object with its base or foot position at a particular location, one can compute the most probable foot positions of the objects. The importance of this step lies in the fact that the previous step yields a diffused map around an actual foot position since integration over windows centered around these nearby points also yields a high value of the integration. The value of such integration maximizes at or close to the actual position. Therefore, as a first approximation, one can compute the foot positions as points in the integration map that are local maximas. Several further considerations are important. Such maximum assumes that the actual object size is exactly equal to the integration region. When the object size is larger than the integration region, the integrated detection map has a plateau instead of a single peak. It can be shown that the bottom-most point of such a plateau occurs at the base position of the object.

Similarly, the left-most point occurs at the left-most point on the object. On the other hand, when the object size is smaller than the integration region, the base position and left-most point of the object can be recovered from the top-most and right-most point of the plateau. A technique may be used to determine if the current object size is greater than or less than the integration region. For instance, by using the value of the integration, which should be close to 1 for the plateau in the case when the object size is larger than the integration region and less than 1 if that is not the case, one can adaptively select either the top-most or bottom-most point of such a plateau. Since such determination is typically very difficult, one approach is to keep the integration region small so that the object size will be typically more than such region, and hence one can simply take the bottom-most point of such plateau to determine the base or foot position of the object.

Detection of objects having irregular shapes, such as humans, presents another challenge. Such irregular shapes sometimes result in the creation of multiple local maximas and plateau regions for a single object. In addition, when multiple objects are located close to each other, it results in partial occlusion of some objects. Such partial occlusions may cause creations of local maximas or plateaus at some false positions. Since such false detections occur within the integration region of a true object, the exemplary method can use a simple technique to remove such false detections. The finding of objects starts from the bottom. The first detections will be true detections since there are no objects in front of these objects that can cause a false detection. Then, for each detection, the technique removes the portions of the image that are determined to contain this object. A simple reasoning to detect this is to remove all of the integration region from consideration. Any detection in such region will be marked as unreliable. Thus, only the reliable detections are retained for final consideration.

In order to detect such objects when they are slightly occluded by another object, one can perform more sophisticated reasoning on the detection integration map, or even the original detection map, in order to more accurately determine the locations of the people or irregularly shaped objects. However, for moderate traffic, when an object is not occluded for too long by any other person standing in front, the method described above is highly effective and accurate in order to distinguish between objects that have their base or foot within the forbidden zone and objects that just happen to occlude such zone, but have their base or foot outside such zone.

Referring back to FIG. 4, the results in the first two images show an example of a case where the system is able to accurately determine the violation of a forbidden zone due to detection of the base or foot of the object. The system triggered an alarm in the second case, but not in the first. Similarly, the system triggered an alarm in the third case where a person is standing in the forbidden zone, but is partially occluded by a pillar.

The method of the present disclosure has application in various security areas where it is important to detect if people have entered a zone that is forbidden to them. For instance, people can be standing in such zones in public places such as trains and train stations, airports, museums, parking lots and the like, or could have left unauthorized objects in such zones. Often, the region may also be quite crowded, and this method can be quite useful. Other application areas include industrial automation and control, and automotive applications.

In alternate embodiments of the apparatus 100, some or all of the computer program code may be stored in registers located on the processor chip 102. In addition, various alternate configurations and implementations of the background modeling unit 170 and the dynamic programming unit 180 may be made, as well as of the other elements of the system 100. In addition, the methods of the present disclosure can be performed in color or in gray level.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A computer implemented method for video-based encroachment detection, the method performed by the computer comprising the steps of:
   receiving first and second images;
   modeling a background from the first image;
   subtracting the background from the second image to provide a detection map;
   calibrating the size of an object at different parts of the image from the pixel level;
   integrating a projection of the object with the detection map using dynamic programming to form an integration map;
   computing true base positions in the presence of partial occlusions as points in the integration map that are local maxima; and
   detecting the object in a region if the true base position of the projection matches that region of the detection map.

2. A method as defined in claim 1 wherein the size of the object comprises a specified range and the region corresponds to a prohibited area.

3. A method as defined in claim 1, further comprising:
determining whether a base of the object is grounded in the region; and
signaling an alarm if the base of the object is grounded in the region.

4. A method as defined in claim 1, further comprising determining if there is a new object at a given pixel in the image.

5. A method as defined in claim 1, further comprising integrating pixel-wise detections from the detection map using dynamic programming.

6. A method as defined in claim 1, further comprising processing an integration map to determine the base position of an object.

7. A method as defined in claim 1, further comprising eliminating false base positions that arise due to partial occlusions by using detections that are determined to be reliable.

8. A method as defined in claim 7 wherein the first detection starting from the bottom is determined to be reliable.

9. A method as defined in claim 1, further comprising distinguishing between detections of objects that simply occlude an area versus detection of objects that have their base in the area.

10. A method as defined in claim 1, further comprising performing temporal reasoning to determine if an object remains in a forbidden zone or region for a specified period of time.

11. A method as defined in claim 1, further comprising performing temporal reasoning to determine if an object becomes stationary in a forbidden zone or region.

12. A method as defined in claim 1 wherein calibrating the size of an object from the pixel level is a simple object size calibration rather than a full calibration.

13. A system for video-based encroachment detection between first and second images comprising:
a processor;
a background modeling unit in signal communication with the processor for modeling a background from the first image and subtracting the background from the second image to provide a detection map; and
a dynamic programming unit in signal communication with the processor for calibrating the size of an object from the pixel level, integrating a projection of the object with the detection map to form an integration map, computing true base positions in the presence of partial occlusions as points in the integration map that are local maxima, and detecting the object in a region if the true base position of the projection matches that region of the detection map.

14. A system as defined in claim 13, further comprising at least one of an imaging adapter and a communications adapter in signal communication with the processor for receiving image data.

15. A system as defined in claim 13, further comprising:
base means in signal communication with the processor for determining whether a base of the object is grounded in the region; and
an alarm in signal communication with the base means for signaling if the base of the object is grounded in the region.

16. A system as defined in claim 13, further comprising:
reliability means in signal communication with the processor for determining that the first detection starting from the bottom is reliable; and
occlusion means in signal communication with the reliability means for excluding false base positions that arise due to partial occlusions by using detections that are determined to be reliable.

17. A computer-readable medium, tangibly embodying a computer program to perform program steps for video-based encroachment detection between first and second images, the program steps comprising:
receiving first and second images;
modeling a background from the first image;
subtracting the background from the second image to provide a detection map;
calibrating the size of an object from the pixel level;
integrating a projection of the object with the detection map using dynamic programming to form an integration map;
computing true base positions in the presence of partial occlusions as points in the integration map that are local maxima; and
detecting the object in a region if the true base position of the projection matches that region of the detection map.

18. A computer-readable medium as defined in claim 17, the program steps further comprising:
determining whether a base of the object is grounded in the region; and
signaling an alarm if the base of the object is grounded in the region.

19. A computer-readable medium as defined in claim 17, the program steps further comprising eliminating false base positions that arise due to partial occlusions by using detections that are determined to be reliable as being the first detection starting from the bottom.

20. A computer-readable medium as defined in claim 17, the program steps further comprising at least one of:
performing temporal reasoning to determine if an object remains in a forbidden zone or region for a specified period of time; or
performing temporal reasoning to determine if an object becomes stationary in a forbidden zone or region.

* * * * *